United States Patent
Miyazawa

(10) Patent No.: US 7,550,702 B2
(45) Date of Patent: Jun. 23, 2009

(54) ELECTRO OPTICAL DEVICE, METHOD FOR CORRECTING LIGHT INTENSITY OF AN ELECTRO OPTICAL ELEMENT, AND ELECTRONIC APPARATUS

(75) Inventor: Takao Miyazawa, Shimosuwa-machi (JP)

(73) Assignee: Seiko Epson Corporation, Tokyo (JP)

(*) Notice: Subject to any disclaimer, the term of this patent is extended or adjusted under 35 U.S.C. 154(b) by 42 days.

(21) Appl. No.: 11/748,192

(22) Filed: May 14, 2007

(65) Prior Publication Data
US 2008/0042045 A1 Feb. 21, 2008

(30) Foreign Application Priority Data
Jun. 26, 2006 (JP) ............... 2006-174945

(51) Int. Cl.
G01J 1/32 (2006.01)
B41J 2/435 (2006.01)
(52) U.S. Cl. ...................... 250/205; 347/246
(58) Field of Classification Search ................ 250/205, 250/214 R, 214.1, 221; 315/154, 307, 291, 315/149; 362/800; 345/63, 76–81, 207; 347/236–238, 133, 246; 348/84, 85; 359/601–604, 359/230
See application file for complete search history.

(56) References Cited

U.S. PATENT DOCUMENTS 7,135,664 B2 * 11/2006 Vornsand et al. ............ 250/205
7,154,517 B2 * 12/2006 Kawasaki et al. ........... 347/133
7,405,384 B2 * 7/2008 Klosowiak et al. .......... 250/205
2008/0111878 A1 * 5/2008 Fujikawa et al. ............ 347/236

FOREIGN PATENT DOCUMENTS

JP    A 2002-144634    5/2002
JP    A 2005-81696     3/2005

* cited by examiner

*Primary Examiner*—Georgia Y Epps
*Assistant Examiner*—Pascal M Bui-Pho
(74) *Attorney, Agent, or Firm*—Oliff & Berridge, PLC

(57) ABSTRACT

A correction value determining method for each of a plurality of electro optical elements whose light intensity is controlled in accordance with a gray scale value and a correction value, the method comprising the steps described below. (a) Measuring a light intensity of the each electro optical element when the same gray scale value is specified to each of the electro optical elements. (b) Determining the correction value for each of the plurality of electro optical elements so that a light intensity after correction of one of the electro optical elements when a predetermined gray scale value is specified thereto whose light intensity measured in step (a) is a first light intensity exceeds a light intensity after correction of another one of the electro elements when the predetermined gray scale value is specified thereto whose light intensity measured in step (a) is a second light intensity which exceeds the first light intensity.

8 Claims, 12 Drawing Sheets

FIG. 11

| t | E_std PC[i] | E_max PC[i] | E_min PC[i] | δ | E_max PC[i] | E_min PC[i] | δ |
|---|---|---|---|---|---|---|---|
| 1 | 1 | 1 | 1 | 0 | 0.99 | 1.01 | −0.02 |
| 0.1 | 0.99 | 0.991 | 0.988 | 0.0031 | 0.982 | 0.998 | −0.0164 |
| 0.2 | 0.98 | 0.983 | 0.977 | 0.0062 | 0.973 | 0.986 | −0.0129 |
| 0.3 | 0.97 | 0.974 | 0.965 | 0.0094 | 0.965 | 0.974 | −0.0093 |
| 0.4 | 0.96 | 0.965 | 0.953 | 0.0126 | 0.956 | 0.962 | −0.0056 |
| 0.5 | 0.95 | 0.957 | 0.942 | 0.0159 | 0.948 | 0.950 | −0.0019 |
| 0.6 | 0.94 | 0.948 | 0.930 | 0.0193 | 0.940 | 0.938 | 0.0019 |
| 0.7 | 0.93 | 0.940 | 0.918 | 0.0228 | 0.931 | 0.926 | 0.0058 |
| 0.8 | 0.92 | 0.931 | 0.907 | 0.0263 | 0.923 | 0.914 | 0.0098 |
| 0.9 | 0.91 | 0.922 | 0.895 | 0.0299 | 0.915 | 0.902 | 0.0138 |
| 1.0 | 0.90 | 0.914 | 0.883 | 0.0336 | 0.906 | 0.890 | 0.0180 |
| 1.1 | 0.89 | 0.905 | 0.872 | 0.0374 | 0.898 | 0.878 | 0.0222 |
| 1.2 | 0.88 | 0.896 | 0.860 | 0.0413 | 0.889 | 0.866 | 0.0265 |

TB0　　TB1　　TB2

ELECTRO OPTICAL DEVICE, METHOD FOR CORRECTING LIGHT INTENSITY OF AN ELECTRO OPTICAL ELEMENT, AND ELECTRONIC APPARATUS

BACKGROUND

1. Technical Field

The present invention relates to a technology for correcting light intensity (power) of an electro optical element such as a light emitting element or the like.

2. Related Art

In an electro optical device in which many electro optical elements are arranged, there is a problem in that variation of light intensity caused by the property of each electro optical element and the error (difference from the design value or variation between each element) of the property of an active element for driving the electro optical element. In JP-A-2002-144634 (hereinafter, referred to as Patent Document 1) and JP-A-2005-081696 (hereinafter, referred to as Patent Document 2), a technique is disclosed for eliminating the variation of each light intensity by correcting the electric energy supplied to each light emitting element. For example, when the light intensity of each light emitting element in the case of no correction varies in the range of $\Delta 0$ as shown in FIG. 20, the light intensities of all of the light emitting elements are adjusted to a predetermined value Pave at the time TA when the electro optical device is started to be used by increasing the electric energy supplied to a light emitting element whose light intensity is low (for example, the light emitting element E1 having light intensity P0_a) as compared with the electric energy of the light emitting element (for example, the light emitting element having light intensity P0_b) E2 whose light intensity is high.

Incidentally, the electro optical element (in particular, the light emitting element such as an organic light emitting diode) is deteriorated with time caused by supply of electric energy. Deterioration of the electro optical element is facilitated as high energy is supplied thereto. Accordingly, when light intensity is corrected as in FIG. 20, the light emitting element E1 whose light intensity is low in the case of no correction (that is, light emitting device in which electrical energy is corrected in the increase direction) is rapidly deteriorated than the light emitting element E2 whose light intensity is high in the case of no correction. Accordingly, in the structure described in Patent Document 1 and Patent Document 2, there is a problem in that the error of the property of each light emitting element is increased with time. For example, although the light intensity of all of the light emitting elements is equalized at the time TA as in FIG. 20, the difference of the light intensity of the light emitting elements E1 and E2 is increased to $\Delta 1$ at the time TB when a predetermined time has passed form the time TA. Further, there is a case in that the difference becomes larger than the range $\Delta 0$ of the light intensity in the case where no electric energy is corrected.

SUMMARY

An advantage of some aspects of the invention is that it provides a correction value determining method for each of a plurality of electro optical elements whose light intensity is controlled in accordance with a gray scale value and a correction value, the method comprising the steps below. (a) Measuring a light intensity of the each electro optical element when the same gray scale value is specified to each of the electro optical elements (for example, step S10 in FIG. 7). (b) Determining the correction value for each of the plurality of electro optical elements so that a light intensity after correction (for example, light intensity PC[v] of FIG. 5) of one of the electro optical elements when a predetermined gray scale value is specified thereto whose light intensity measured in step (a) is a first light intensity (for example, light intensity P0[v] of FIG. 5) exceeds a light intensity after correction (for example, light intensity PC[u] of FIG. 5) of another one of the electro elements when the predetermined gray scale value is specified thereto whose light intensity measured in step (a) is a second light intensity (for example, light intensity P0[u] of FIG. 5) which exceeds the first light intensity (for example, step S20 in FIG. 7).

In the method described above, the correction value of the each electro optical element is determined so that the light intensity after correction of the electro optical element from which the first light intensity is measured exceeds the light intensity after correction of the electro optical element from which the second light intensity which exceeds the first light intensity is measured. Accordingly, as compared with the conventional structure in which the light intensity of each electro optical element is corrected to the same value, the variation of the light intensity of each electro optical element may be restricted for a long period.

The electro optical element in the invention is an element whose light intensity is varied in accordance with electrical operation such as supply of current, application of voltage, or the like (application of electrical energy). In this regard, the invention is particularly preferable for the correction of the light intensity of the element (typically, a light emitting element such as an organic light emitting diode element) whose deterioration aspect (for example, velocity of deterioration) of the property is different in accordance with electrical energy to be applied.

In step (b) of a preferable aspect of the invention, the correction value is determined for the each electro optical element so that a range (for example, range $\Delta C$ of FIGS. 4 and 5) in which light intensity after correction of each of the plurality of the electro optical elements when the predetermined gray scale value is specified thereto is distributed becomes narrow than a range (for example, range $\Delta 0$ of FIGS. 4 and 5) in which light intensity of each of the plurality of the electro optical elements measured when the predetermined gray scale value is specified thereto in step (a) is distributed. According to the aspect, the range in which light intensity after correction is distributed is restricted, so that the variation of the light intensity of each electro optical element can be surely reduced.

In the correction value determining method according to a further preferable aspect, further comprising setting a standard light intensity from light intensity of the each electro optical element measured in step (a) (for example, step S21 of FIG. 9). Further, in step (b), the correction value is determined for the each electro optical element so that a light intensity after correction of one of the electro optical elements whose light intensity measured in step (a) exceeds the standard light intensity falls below the standard light intensity and a light intensity after correction of one of the electro optical elements whose light intensity measured in step (a) falls below the standard light intensity exceeds the standard light intensity. The standard light intensity is the average value of the light intensity (Pave) of each electro optical element measured, for example, in step (a). According to the above aspect, the light intensity of each electro optical element after correction is distributed in both of the range which exceeds the standard light intensity and the range which falls below the standard light intensity. Accordingly, as compared with the structure in which the light intensity of all of the electro optical elements is distributed within only the range which falls below the standard light intensity (or only the range which exceeds the standard light intensity), possibility of drastic change of the overall light intensity of the plurality of electro optical elements both before and after correction is reduced. For example, the problem in which the overall light intensity of the electro optical elements after correction is remarkably reduced as compared with before correction is eliminated.

In step (b) of another aspect of the invention, the correction value is determined for each of the plurality of electro optical elements so that light intensity after correction when a predetermined gray scale value is specified to some of the each electro optical elements whose light intensity measured in step (a) is within a predetermined range (for example, the range from the light intensity P0A to the light intensity P0B of FIG. 17) becomes the same value (for example, the light intensity Pave of FIG. 17). According to the above aspect, the light intensity after correction of each electro optical element within a predetermined range is equalized, so that the variation of the light intensity of each electro optical element is restricted as compared with the aspect in which all of the electro optical elements are corrected to different light intensities.

The invention is also specified as a device (correction value determining device) for determining the correction value by the above method. The correction value determining device is equipped with a light intensity measuring section (for example, the sensor 57 of FIG. 6) for measuring the light intensity of each electro optical element when the same gray scale value is specified to each thereof and a correction value determining section (for example, the control unit 51 of FIG. 6) for determining the correction value for each of the plurality of electro optical element so that the light intensity after correction of the electro optical element when a predetermined gray scale value is specified thereto whose light intensity measured with the light intensity measuring section is a first light intensity exceeds the light intensity after correction of the electro optical element when the predetermined gray scale value is specified thereto whose light intensity measured with the light intensity measuring section is a second light intensity which exceeds the first light intensity. The same operation and effect as the correction value determining method of the invention can be obtained also in the above structure.

Further, the invention is specified as an electro optical device for correcting light intensity of each electro optical element based on the correction value determined by the method described above. The electro optical device of the invention includes a plurality of electro optical elements, a driver for controlling each of the plurality of electro optical elements to have a light intensity corresponding to a gray scale value and a correction value, and a memory for storing the correction value for the each electro optical element. The each correction value stored in the memory is selected so that a light intensity after correction of one of the electro optical elements whose light intensity becomes a first light intensity when a predetermined gray scale value is specified exceeds a light intensity after correction of another one of the electro optical elements whose light intensity becomes a second light intensity which exceeds the first light intensity when the predetermined gray scale value is specified. According to the method of the invention, the variation of light intensity of each electro optical element is restricted for a long period, so that the long life of the electro optical device can be realized.

Note that, in the structure in which the electro optical element is controlled by, for example, supply of a driving current, any one of a current value and a pulse width of the driving current may be adjusted in accordance with the correction value (for example, FIG. 11 or FIG. 12), or both of a current value and a pulse width of the driving current may be adjusted in accordance with the correction value (for example, FIG. 15).

The electro optical device according to the invention may be used for various electronic apparatuses. A typical example of the electronic apparatus according to the invention is an image formation device of an electrophotographic system type in which the electro optical device according to the above each embodiment is utilized for exposure of an image carrying body such as a photosensitivity drum. The image forming device includes an image carrying body on which a latent image is formed by exposure, the electro optical device of the invention for exposing the image carrying body, a developer for forming a developed image by addition of a developer (for example, toner) to the latent image on the image carrying body. However, application of the electro optical device according to the invention is not limited to exposure of the image carrying body. For example, the electro optical device according to the invention can be used for illumination of a manuscript in an image reading device such as a scanner. The image reading device is equipped with the electro optical device according to the above each aspect and a light receiving device (for example, a light receiving element such as a CCD (Charge Coupled Device)) for converting the light emitted from the electro optical device and reflected at an object to be read (manuscript) into an electronic signal. Further, the electro optical device in which electro optical elements are arranged in a matrix manner is also used as a display device of various electronic apparatuses such as a personal computer, a mobile phone, and the like.

BRIEF DESCRIPTION OF THE DRAWINGS

The invention will be described with reference to the accompanying drawings, wherein like numbers reference like elements.

FIG. 11 is a numerical table explaining advantage of the embodiment.

DESCRIPTION OF EXEMPLARY EMBODIMENTS

A: First Embodiment

Figure 1:
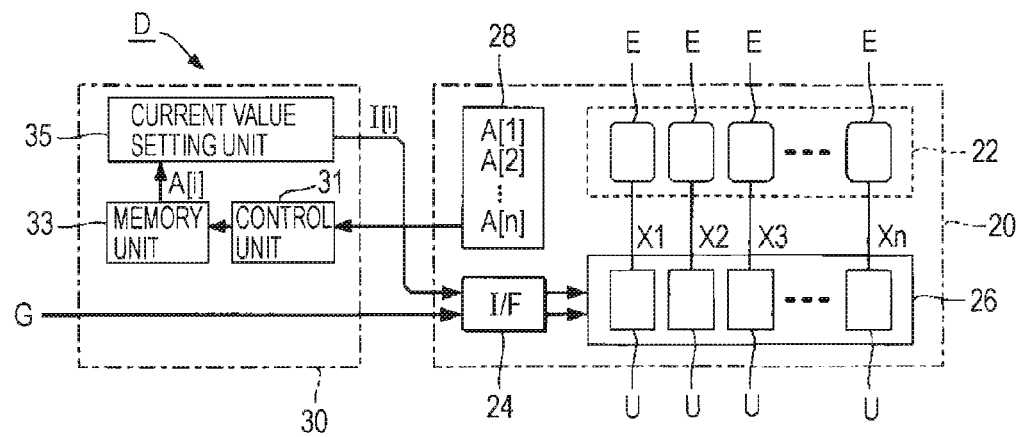
FIG. 1 is a block diagram showing a structure of an electro optical device according to a first embodiment.

FIG. 1 is a block diagram for showing a structure of an electro optical device according to a first embodiment of the invention. The electro optical device D is employed for an image forming device of an electronic photograph system as an exposure device (line head) for exposing a photoreceptor drum. As shown in FIG. 1, the electro optical device D includes a head module 20 for emitting light beam toward a photoreceptor drum in accordance with a desired image and a controller 30 for controlling the operation of the head module 20. The head module 20 and the controller 30 are electrically connected via, for example, a flexible wiring substrate (omitted in FIG. 1).

The head module 20 includes a light emitting unit 22, an interface circuit 24, a driving circuit 26, and a memory unit 28. N (n is a natural number) electro optical elements E are arranged in a straight manner along the main scanning direction in the light emitting unit 22. The electro optical element E of the embodiment is an organic light emitting diode element having a light emitting layer formed by an organic EL (Electroluminescence) material between a positive electrode and a negative electrode opposed to each other. The interface circuit 24 relays the data given and received between a controller 30 and a driving circuit 26.

The driving circuit 26 is means for driving each electro optical device E and includes n unit circuits U each corresponding to a separate electro optical element E. Note that the driving circuit 26 may be constituted by one IC chip or a plurality of IC chips, or may be constituted by many active devices (for example, a thin film transistor whose semiconductor layer is formed by low-temperature polysilicon) formed on a surface of a substrate with each electro optical element E.

Figure 2:
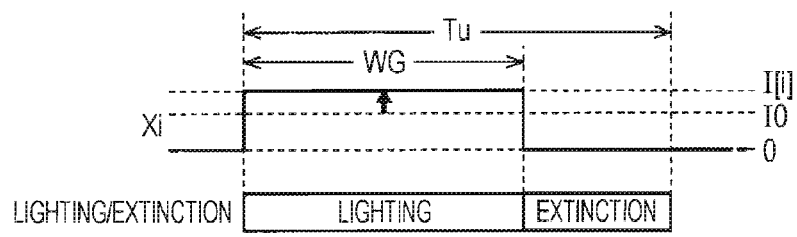
FIG. 2 is a timing chart showing a relation between a waveform of a driving signal and an operation of an electro optical element.

The unit circuit U of i column (i is an integer number satisfies $1 \leq i \leq n$) generates a driving signal Xi to output the generated driving signal Xi to the electro optical element E of i column. As shown in FIG. 2, the driving signal Xi is a current signal whose current value becomes I[i] over a pulse width WG corresponding to a gray scale value G and becomes zero during the residual period among a term Tu (hereinafter, referred to as a "unit term") which becomes unit of the control of the electro optical element E. The current value I[i] and the gray scale value G (pulse width WG) are specified to each unit circuit U by the digital data supplied from the controller 30 via the interface circuit 24.

Figure 3:
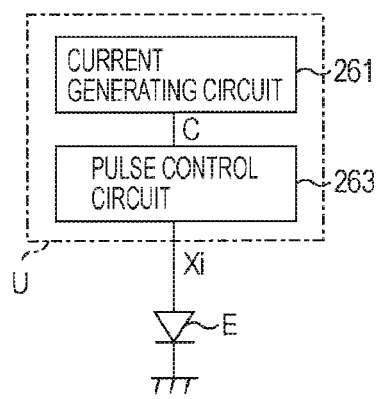
FIG. 3 is a block diagram showing a structure of a unit circuit.

FIG. 3 is a block diagram showing a structure of each unit circuit U (herein, unit circuit U of i column). As shown in FIG. 3, the unit circuit U includes a current generating circuit 261 and a pulse controlling circuit 263. The current generating circuit 261 is a DAC (Digital to Analog Converter) for obtaining and holding the data for specifying the current value I[i] from the controller 30 and for generating a current C of the current value I[i]. The pulse controlling circuit 263 outputs the current C to the electro optical element E over the pulse width WG corresponding to the gray scale value G among the unit term Tu and stops the output of the current C during the residual term.

As shown in FIG. 2, the electro optical element E of i column emits light over the pulse width WG at an intensity (brightness) proportional to the current value I[i] and turns off the light when the current value of the driving signal Xi is lowered to zero. Accordingly, the light intensity (power) Pc[i] of the electro optical element E is controlled in accordance with the current value I[i] and gray scale value G. The light intensity of the electro optical element E in the specification refers to an integration value of intensity (brightness) during the period of emission.

The memory unit 28 in FIG. 1 is means for storing correction values A[1] to A[n] for n electro optical elements E constituting the light emitting unit 22. An involatile memory such as an EEPROM (Electrically Erasable Programmable Read-Only Memory) is preferably employed as for the memory unit 28. The correction value A[i] is a numerical number for specifying a correction rate of the light intensity of the electro optical element E of i column and is written into the memory unit 28 in the manufacturing process of the electro optical device D. The technical significance of the correction values A[1] to A[n] and the decision method of each thereof will be described below.

As shown in FIG. 1, the controller 30 includes a control unit 31, a memory unit 33, and a current value setting unit 35. The control unit 31 reads out the correction values A[1] to A[n] from the memory unit 28 of the head module 20 and stores the correction value A[1] to A[n] into the memory unit 33 (for example, RAM (Random Access Memory) immediately after the power supply of the electro optical device D is input. The current setting unit 35 is means for setting the current value I[i] of each unit circuit U based on the correction value A[i]. As shown in FIG. 2, the current setting unit 35 of the embodiment calculates the current values I[1] to I[n] by correcting an initial value I0 which is common for all the unit circuits U based on the correction values A[1] to A[n]. To be more specific, the current value setting unit 35 calculates the multiplication value of the initial value I0 and correction value A[i] as the current value I[i] ($I[i]=A[i] \times I0$). The current value I[i] calculated by the current value setting unit 35 is specified to the unit circuit U of i column (current generating circuit 261) via the interface circuit 24.

Figure 4:
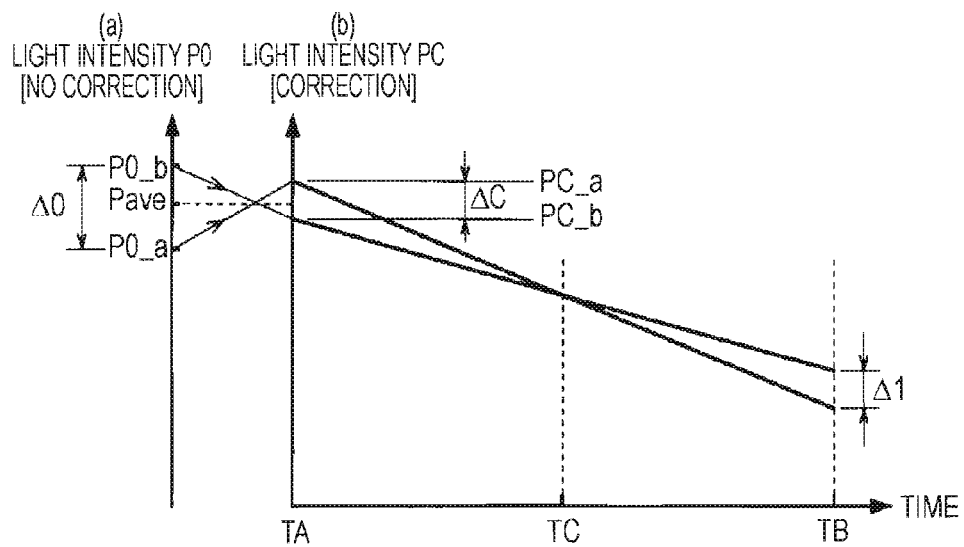
FIG. 4 is a graph showing a change with time of light intensity after correction.

Next, general outline of the decision method of the correction values A[1] to A[n] will be described. Each of the light intensities P0 is shown in the drawing when the gray scale value G0 is specified to each electro optical element E in the case of no correction. The case of no correction refers to the case when no correction of the light intensity based on the correction values A[1] to A[n] is performed (that is, the case when the current C of each unit circuit U is set to the initial value I0). The property of each electro optical element E and the property of an active element constituting each unit circuit U have an error, so that the light intensity P0 of each electro optical element E in the case of no correction does not match to the initial value (design value) and is dispersively distributed in the range of Δ0 of from the minimum value P0_a to the maximum value P0_b as show in the section (a) of FIG. 4. The light intensity Pave in the section (a) of FIG. 4 is the average value of the light intensities P0 (P0[1] to P0[n]) of n electro optical elements E (hereinafter, referred to as "standard light intensity").

Figure 5:
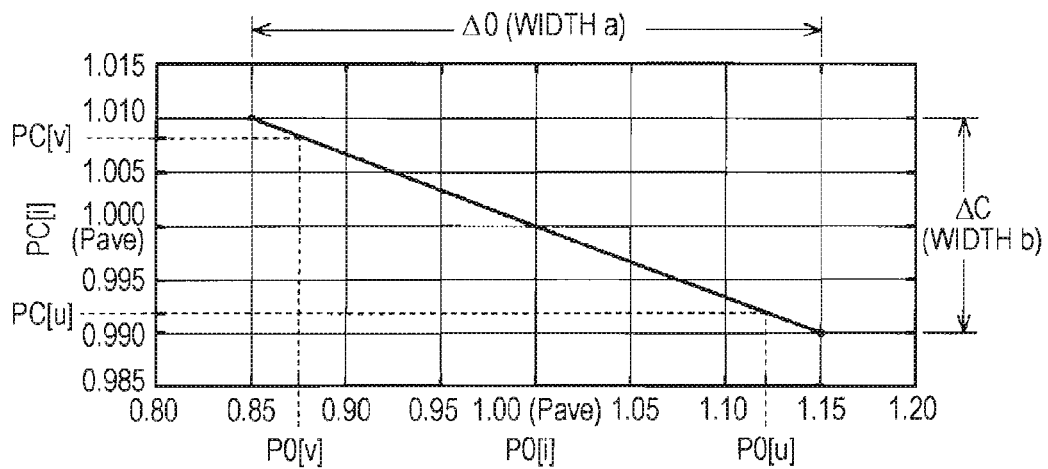
FIG. 5 is a graph showing a relation of light intensity of the electro optical element before and after correction.

FIG. 5 is a graph showing a relation between the light intensity P0 of each electro optical element E in the case of no correction (lateral axis) and the light intensity PC of each electro optical element E after correction (vertical axis). The light intensity P0 and light intensity PC in FIG. 5 are the light intensities when the same gray scale value G0 is specified to each electro optical element E similarly to FIG. 4. Note that the light intensities (P0, PC) of each electro optical element E are normalized as the standard light intensity Pave for "1". In addition, a change with time of the light intensity PC of each electro optical element E after correction is shown in the section (b) of FIG. 4.

The correction values A[1] to A[n] are selected so that the range ΔC (width b) in which the light intensity PC after correction is distributed becomes narrower (b<a) than the range Δ0 (width a) in which the light intensity P0 in the case of no correction is distributed. That is, the variation of the light intensity PC when each electro optical element E is driven by the current values I [1] to I[n] after correction in accordance with the correction values A[1] to A[n] is restricted than the variation of the light intensity P0 in the case of no correction.

Further, as shown in FIG. 5, the correction values A[1] to A[n] in the embodiment are selected so that the light intensity PC after correction is reduced as the light intensity P0 in the case of no correction of the electro optical element E is higher. For example, as shown in FIG. 5, assuming that the light intensity P0[u] of the electro optical element E of u column (u is an integer satisfying 1≦u≦n) in the case of no correction exceed the light intensity P0[v] of the electro optical element E of v column (v is an integer satisfying v≠u, 1≦u≦n) in the case of no correction, the light intensity PC[u] of the electro optical element E of u column after correction falls below the light intensity PC[v] of the electro optical element E of v column after correction.

To be more specific, the light intensity PC after correction of the electro optical element E whose light intensity P0 in the case of no correction exceeds the standard light intensity Pave falls below the standard light intensity Pave and the light intensity PC after correction of the electro optical element E whose light intensity P0 in the case of no correction falls below the standard light intensity Pave exceeds the standard light intensity Pave. Further, as for the electro optical element E whose light intensity P0 in the case of no correction is the standard light intensity Pave, the light intensity PC after correction also becomes the standard light intensity Pave. By selecting the correction values A[1] to A[n] as described above, the light intensity PC after correction at the time TA when the electro optical device D is started to be used is distributed in the range ΔC of from the light intensity PC_a (maximum value) corrected from the light intensity P0_a to the light intensity PC_b (minimum value) corrected from the light intensity P0_b.

As is understood from FIG. 5, the light intensity P0[i] in the case of no correction and the light intensity PC[i] after correction of the electro optical element E positioned at i column satisfy the formula (1) described below.

$$PC[i] = (-b/a) \times P0[i] + \{(a+b)/a\} \times Pave \qquad (1)$$

Further, the light intensity of the electro optical element E is proportional to the current value of the driving signal Xi (see FIG. 2), so that the light intensity P0[i] in the case of no correction and the initial value I0, and the light intensity PC[i] after correction and current value I[i] satisfy the formula (2) described below.

$$I[i]/I0 = PC[i]/P0[i] \qquad (2)$$

The current I[i] in the embodiment is the multiplication value of the initial value I0 and the correction value A[i]. Accordingly, the correction value A[i] is calculated by the formula (3) described below from the relation of the formula (2).

$$A[i] = PC[i]/P0[i] \qquad (3)$$

The correction values A[1] to A[n] are selected so as to satisfy the condition described above, so that, as shown in the section (b) of FIG. 4, the variation of the light intensity PC[i] after correction of each electro optical element E narrows with time from the time TA at which the electro optical device D is started to be used to the time TC and begins to magnify from the time when passed the time TC. Accordingly, as compare with the structure of FIG. 20 in which variation of light intensity continues to magnify with time from the time TA, the variation (Δ1) of the light intensities PC [1] to PC [n] of each electro optical element E at the time TB can be restricted. In other words, the time during which the variation of light intensities PC [1] to PC [n] exceeds an allowable range is prolonged so that the life time of the electro optical device D can be fully assured.

Figure 6:
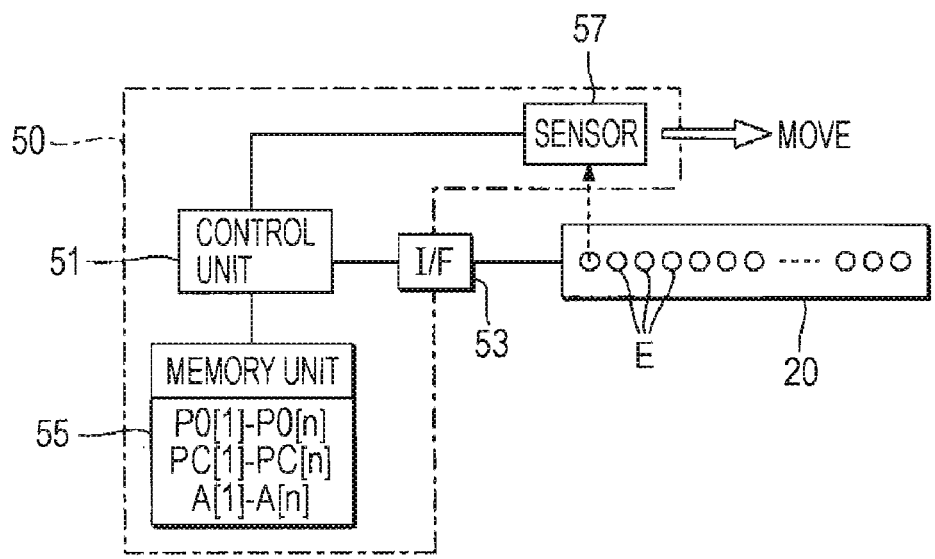
FIG. 6 is a block diagram showing a structure of a correction value determining device.

Next, a structure of a device for determining the correction values A[1] to A[n] (hereinafter, referred to as "correction value determining device") will be described with reference to FIG. 6. A correction value determining device 50 is a device for determining the correction values A[1] to A[n] based on the measurement result of the light intensities P0[1] to P0[n] of each electro optical element E of the head module 20 which is in the state before mounting the controller 30. The correction value determining device 50 includes a control unit 51, an interface circuit 53, a memory unit 55, and a sensor 57.

The control unit 51 (for example, CPU (Central Processing Unit)) performs a various processing by execution of a program. The control unit 51 is electrically connected to the head module 20 via the interface circuit 53. The memory unit 55 (for example, RAM (Random Access Memory)) stores various data generated in the control unit 51. The sensor 57 is a light receiving device (for example, CCD (Chare Coupled Device)) for outputting a signal corresponding to the received light intensity to the control unit 51. The sensor 57 is disposed on the upper side of the head module 20 and is movable along the arrangement of each electro optical element E.

Figure 7:
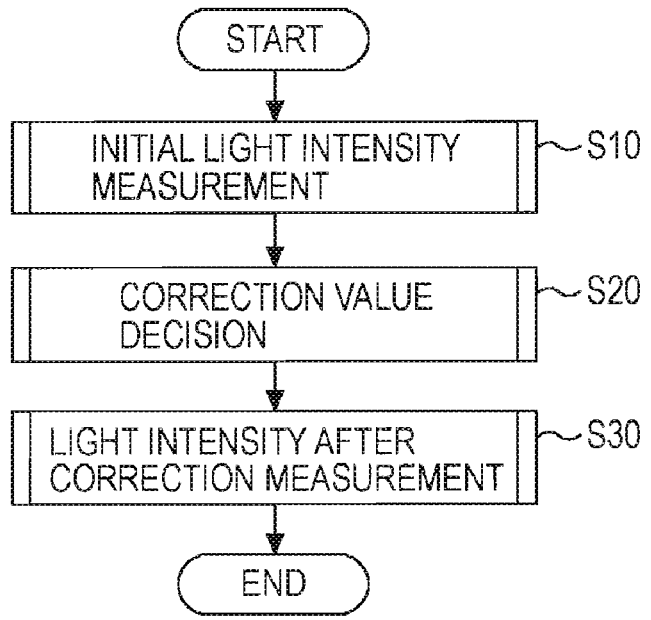
FIG. 7 is a flow chart showing a procedure for determining a correction value.
Figure 8:
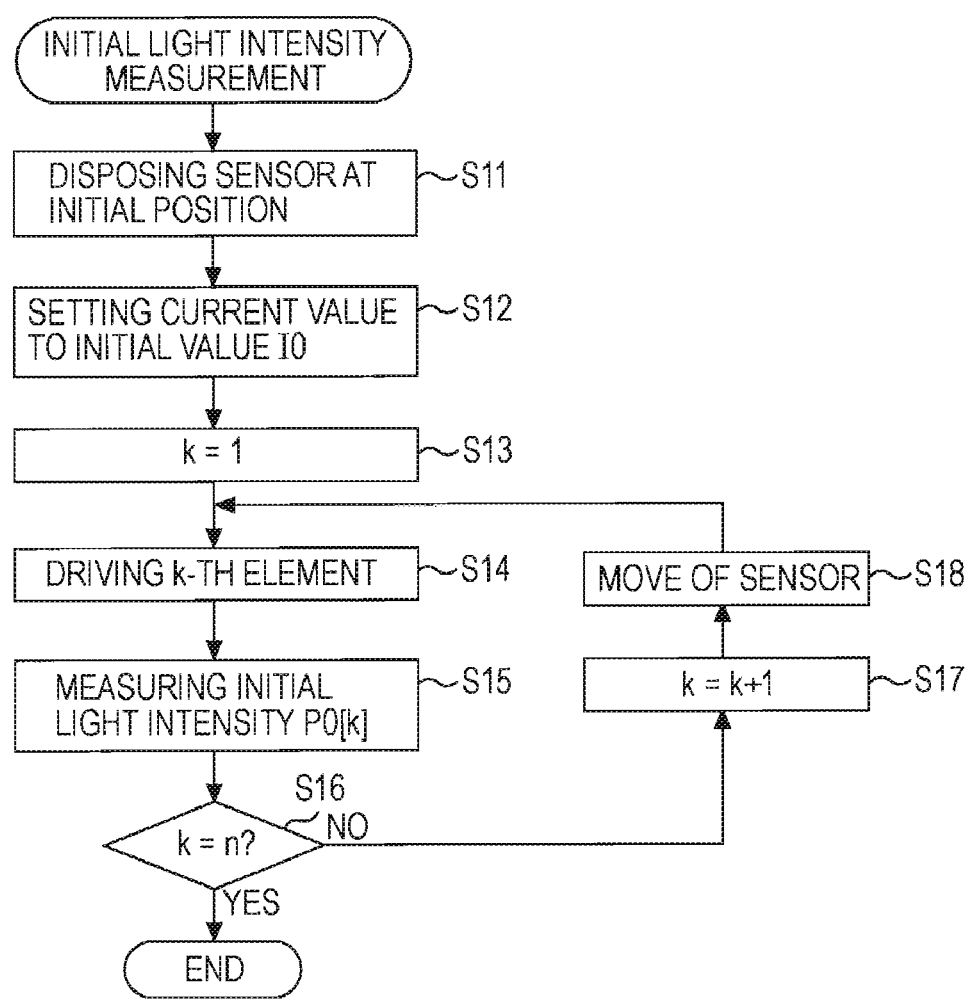
FIG. 8 is a flow chart showing a procedure of initial light intensity measurement process.
Figure 9:
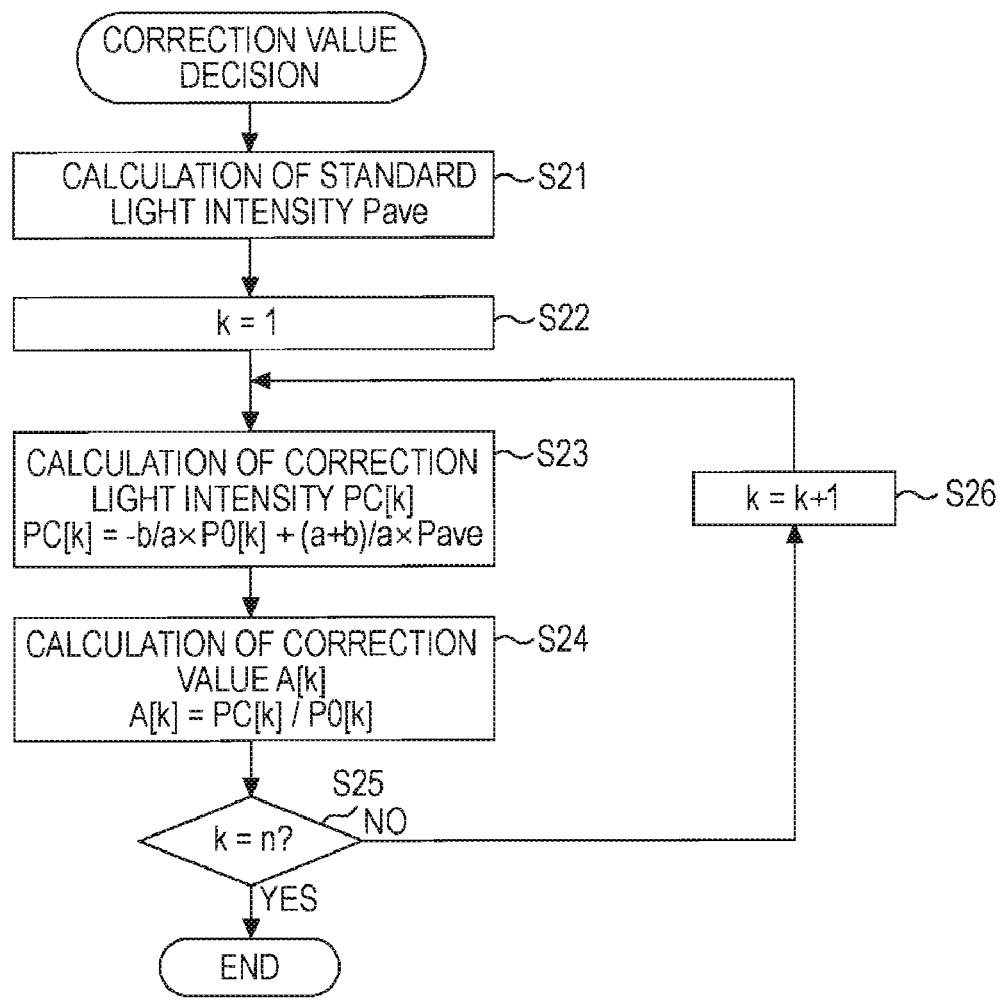
FIG. 9 is a flow chart showing a procedure of correction value decision process.
Figure 10:
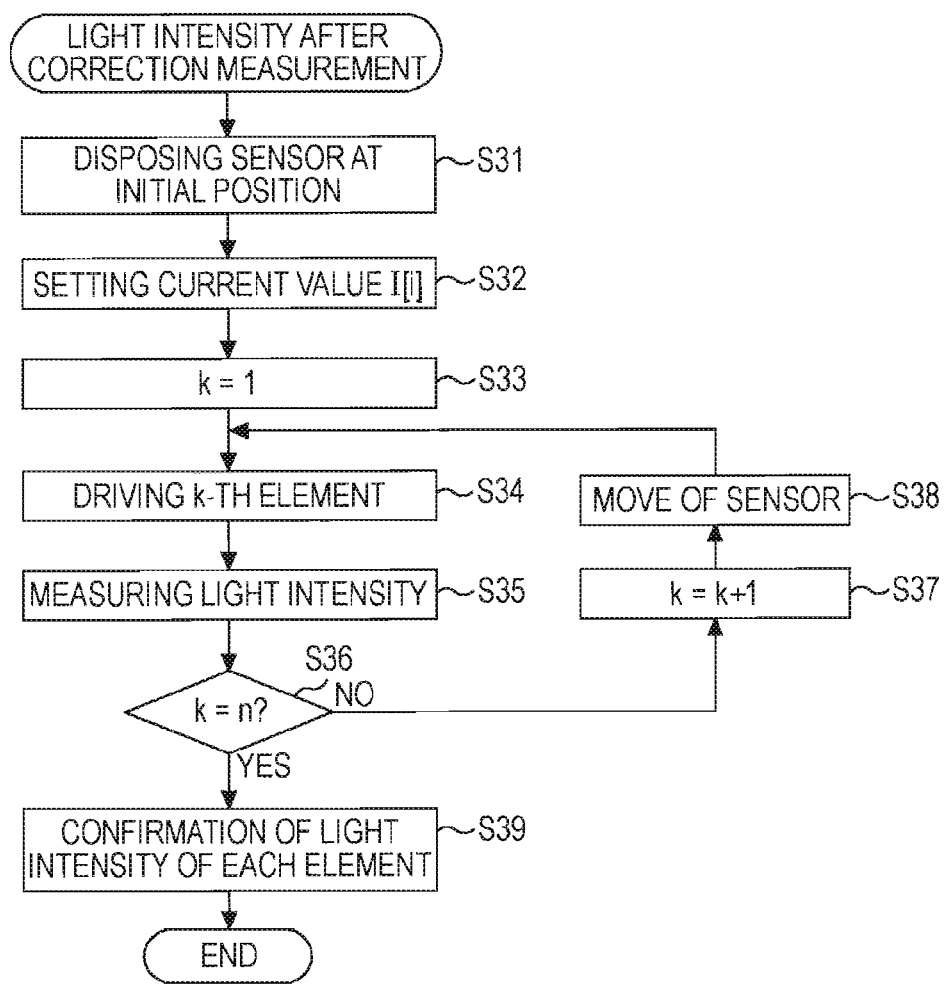
FIG. 10 is a flow chart showing a procedure of light intensity after correction measurement process.

FIG. 7 is a flow chart schematically showing the process performed by the control unit 51. As shown in FIG. 7, the control unit 51 performs initial light intensity measurement process (step S10), correction value decision process (step S20), and light intensity after correction measurement process (step S30) in this order. The initial light intensity measurement process is a process for measuring the light intensities P0[1] to P0[n] in the case of no correction of each electro optical element E (FIG. 8). The correction value decision process is a process for determining the correction values A[1] to A[n] from the light intensity P0[1] to P0[n] in the case of no correction of each electro optical element E (FIG. 9). The light intensity after correction measurement process is a process for judging the adequacy of the correction values A[1] to A[n] determined in the correction value decision process (FIG. 10). The specific content of each process will be described below.

(a) Initial Light Intensity Measurement Process (S10/FIG. 8)

As shown in FIG. 8, when the initial light intensity measurement process is started, the control unit 51 moves the sensor 57 to a predetermined position (for example, upper direction of the electro optical element E of the first column) (step S11) and thereafter specifies the initial value I0 to the current generating circuit 261 of each unit circuit U (step S12). Then, the control unit 51 initializes a parameter K which identifies one electro optical element E to "1" (step S13).

Then, the control unit 51 drives the electro optical element E of K column by outputting the gray scale value G0 to the driving circuit 26 (step S14). The sensor 57 output a signal corresponding to the light intensity received from the electro optical element E in Step 14. The control unit 51 measures the light intensity P0[k] of the electro optical element E of k column based on the signal and stores the measured light intensity P0[k] in the memory unit 55 (step S15). Further, the control unit 51 judges whether the parameter k is the same value or not as the whole sum n of the electro optical elements E (that is, process of S14 and S15 are performed or not for all of the electro optical elements E) (step S16). when the parameter k falls below the whole sum n, the control unit 51 updates the parameter K and selects another electro optical element E (step S17), moves the sensor 57 to the position corresponding to newly selected electro optical element E (step S18), and thereafter repeat the process of S14 and S15. Accordingly, in the step in which the result of judgment in step S16 becomes positive (k=n), the light intensities P0[1] to P0[n] are stored in the memory unit 55 as shown in FIG. 6.

(b) Correction Value Decision Process (S20/FIG. 9)

As shown in FIG. 9, when the correction value decision process is started, the control unit 51 calculates the average value of the light intensities P0[1] to P0[n] measured in the initial light intensity measurement process as the standard light intensity Pave (step S21). Further, the control unit 51 initializes the parameter K to "1" (step S22)

Then, the control unit 51 calculates the light intensity PC[k] after correction by performing the calculation of the formula (1) based on the light intensity P0[k] measured in the initial light intensity measurement process and the standard light intensity Pave calculated in step S21 (step S23). As shown in FIG. 6, the light intensity PC[k] is stored in the memory unit 55. Numerical number a in the formula (1) (fluctuation range of the light intensity P0) is specified by the control unit 51 as a difference value between the maximum value and the minimum value of the light intensities P0[1] to P0[n]. Further, numerical number b which is a numerical number smaller than numerical number a is preliminarily determined in accordance with operation of an operator.

Then, the control unit 51 determines the correction value A[k] by performing calculation of the formula (3) based on the light intensity P0[k] and the light intensity PC[k] calculated in step S23 and stores the correction value A[k] in the memory unit 55 (step 24). The control unit 51 sequentially selects a non-processed electro optical element E and repeats the process of step S23 and step S24 (steps S25, S26), and calculates the correction values A[1] to A[n] for n electro optical elements E to stop the correction value decision process (step S25: YES).

(c) Light Intensity After Correction Measurement Process (S30/FIG. 10)

When the light intensity after correction measurement process is started, the control unit 51 moves the sensor 57 on the upper side of the electro optical element E of the first column (step S31). Then, the control unit 51 specifies the current values I[i] to I[n] corrected from the initial value I0 based on the correction values A[1] to A[n] determined in the correction value decision process to each unit circuit U of the driving circuit 26 (step S32). Accordingly, the current generating circuit 261 of the unit circuit U of i column begins to generate the current C having the current value I[i]. Further, the control unit 51 initializes the parameter k to "1" (step S33).

Then, the control unit 51 sequentially performs driving of the electro optical element E of k column based on output of the gray scale value G0 (step S34) and measuring of the light intensity PC[k] (step S35) for each of the n electro electrical elements E similarly to steps S14 to S18 of the initial light intensity measurement process (steps S34 to S38). When the measurement of the light intensities PC[1] to PC[n] is finished, the control unit 51 judges whether the correction values A[1] to A [n] have appropriately determined or not, and outputs the result (step S39), and thereafter finishes the light intensity after correction measurement process. In the step S39, for example, adequacy of the correction values A[1] to A[n] is judged depending on whether or not the light intensities PC[1] to PC[n] have fallen within a predetermined range(for example, range ΔC of width b). Then, when the correction values A[1] to A[n] are inappropriate, the process in FIG. 7 is performed again.

When adequate collection values A[1] to A[n] are determined through each process, the control unit 51 outputs the collection values A[1] to A[n] stored in the memory unit 55 to the head module 20. The collection values A[1] to A[n] supplied from the collection value determining device 50 are sequentially stored in the memory unit 28. When the operation described above is finished, the controller 30 is mounted to the head module 20 and the electro optical device D is completed.

Figure 12:
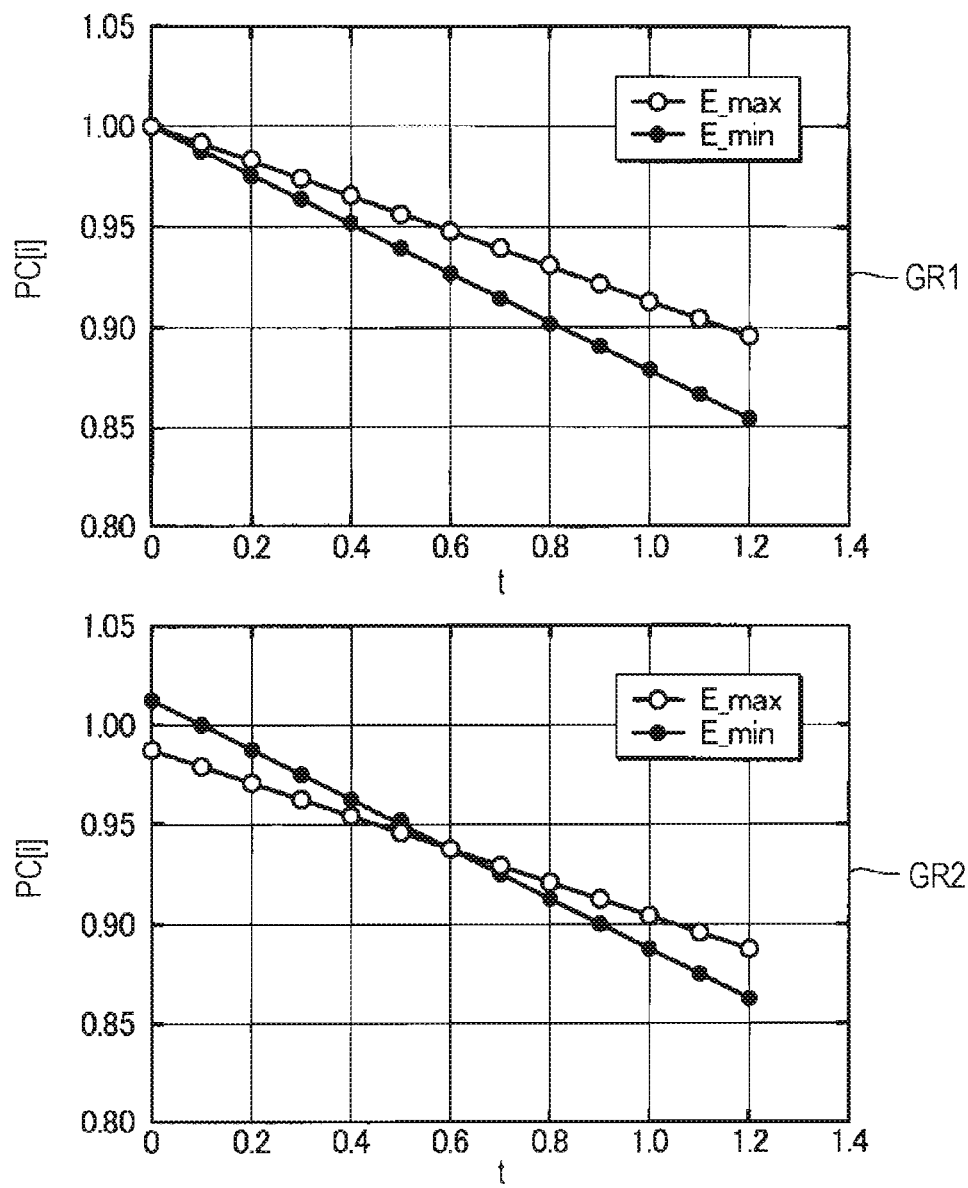
FIG. 12 is a graph explaining advantage of the embodiment.

FIG. 11 is a numerical table showing a calculation result of a relationship between the light intensity PC[i] after correction of each electro optical element E and a cumulative vale of a time (hereinafter, simply referred to as "elapsed time") during which each electro optical element E is actually emitted. FIG. 12 is a graph in which each numerical number in FIG. 11 is plotted. In this regard, each property of the electro optical element E_max whose initial light intensity P0[i] in the case of no correction was the maximum value of "1.05" and the electro optical element E_min whose initial light intensity P0[i] in the case of no correction was the minimum value of "0.95" is typically shown in FIGS. 11 and 12 suppose that the standard light intensity Pave is "1". Further, the numerical table TB0 of FIG. 11 shows a property of the electro optical element E_std whose light intensity in the case of no correction is the standard light intensity Pave (accordingly, the standard light intensity after correction is also the standard light intensity Pave). The elapsed time t is normalized as "1" at the time when the light intensity of the electro optical element E_std is lowered by 10% from the initial value (light intensity when the elapsed time t is "0").

Figure 20:
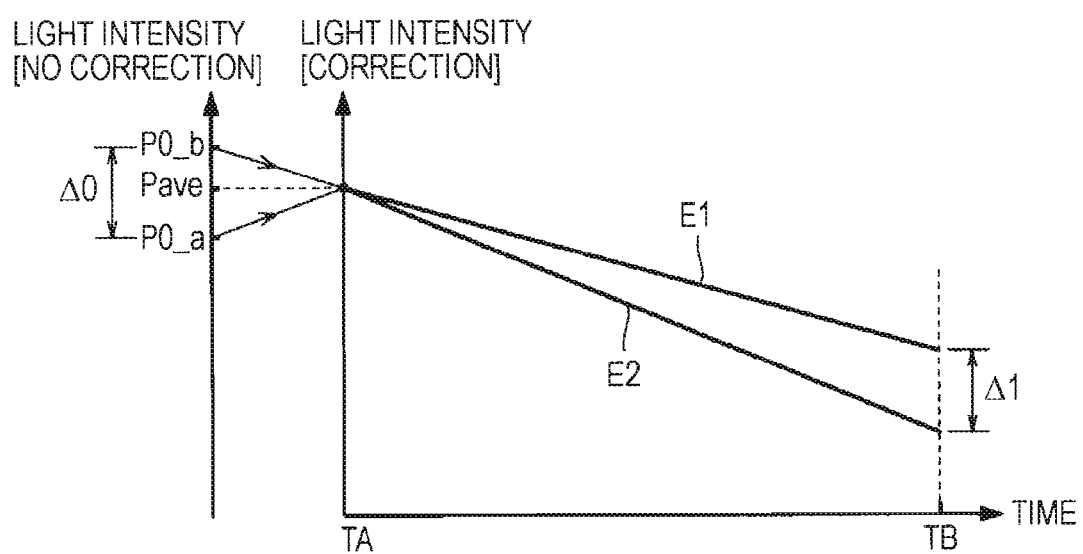
FIG. 20 is a graph showing a change with time of light intensity after correction in a conventional structure.

Like in FIG. 20, the numerical table TB1 of FIG. 11 shows a property of the structure (hereinafter, referred to as "contrast example") in which the correction values A[1] to A[n] are determined so that the light intensities PC[1] to PC[n] after correction of each electro optical element E becomes equal to the standard light intensity Pave. The numerical table TB2 of FIG. 12 shows a property of the embodiment in which the correction values A[1] to A[n] are determined so that the light intensity PC[i] after correction becomes small as the light intensity P0[i] in the case of no correction of each electro optical element E becomes large as shown in FIG. 4. As shown in the numerical table TB2 of FIG. 11, the light intensity PC[i] of the electro optical element E_max is corrected to "0.99" and the light intensity PC[i] of the electro optical element E_min is corrected to "1.01" in the embodiment.

The variation δ described in the numerical tables TB1 and TB2 of FIG. 11 is a numerical number obtained by dividing the difference value of the light intensity PC[i] after correction of the electro optical element E_max and the light intensity PC[i] of the electro optical element E_min by the light intensity of the electro optical element E_std. As shown in the numerical table TB1 of FIG. 11 and the graph GR1 of FIG. 12, the variation δ in the structure of the contrast example becomes "0" at the time when the elapsed time t is "0" although the variation δ is expanded with elapsed time and is expanded to "3.366" when the elapse time is "1". On the other hand, in the structure of the embodiment as shown in the numerical time table TB2 of FIG. 11 and the graph GR2 of FIG. 12, although the variation δ becomes "−0.02" at the time when the elapsed time t is "0", the variation δ is reduced with time and thereafter is turned into expansion at a particular time (at a time when elapsed time t is about "0.6") and is restricted to "0.0180" at the time when the elapsed time t is "1". As described above, in the embodiment, the period during which the variation δ is restricted in a predetermined range can be surely prolonged.

Note that, as shown in the numerical table TB2 of FIG. 11 and the graph GR2 of FIG. 12, the variation δ at the time when the elapsed time t is "0" becomes not zero in the structure of the embodiment. When the variation δ is too large, there is a possibility that the variation of the gray scale of the image output from the image forming device becomes remarkable. Accordingly, in the embodiment, the correction values A[1] to A [n] are determined so that the variation δ is restricted within the range in which the user cannot perceive the variation of gray scale. For example, the correction values A[1] to A [n] are selected so that the variation δ at the time when the elapsed time t is "0" is restricted not more than "0.05 (5% of the light intensity PC[i] of the electro optical element E_std), and more preferably, selected so that the variation δ becomes not more than "0.03 (3%)".

B: Second Embodiment

Next, a second embodiment of the invention will be described. In the first embodiment, the structure is exemplified in which the light intensity PC[i] of the electro optical element E is corrected by setting the current value I[i] of the driving signal Xi in accordance with the correction value A[i]. On the other hand, in the embodiment, the light intensity PC[i] of the electro optical element E is corrected by setting the pulse width of the driving signal Xi in accordance with the correction value A[i]. Note that the elements having the same operation and function as the first embodiment are designated by like reference numerals and description thereof will be appropriately omitted.

Figure 13:
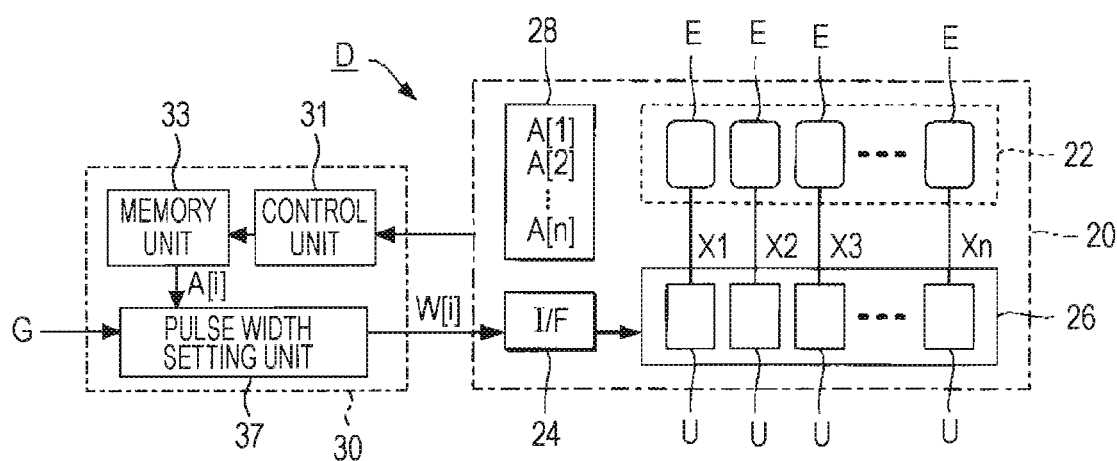
FIG. 13 is a block diagram showing a structure of an electro optical device according to a second embodiment.
Figure 14:
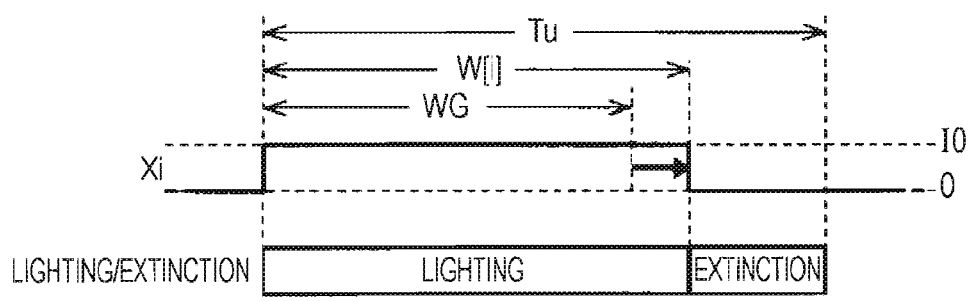
FIG. 14 is a timing chart showing a relation between a waveform of a driving signal and an operation of an electro optical element.

FIG. 13 is a block diagram showing a structure of an electro optical device D according to the embodiment. The electro optical device D of the embodiment is equipped with a pulse width setting unit 37 instead of the current value setting unit 35 of FIG. 1. The memory unit 33 outputs the correction value A[i] to the pulse width setting unit 37 at the timing when the gray scale value G of electro optical element E of i column is supplied to the pulse width setting unit 37. The pulse width setting unit 37 is means for specifying a pulse width W[i] varied from the pulse width WG corresponding to the gray scale value G in accordance with the correction value A[i] to the unit circuit U of i column. The pulse width setting unit 37 of the embodiment calculates the multiplication value of the gray scale value G (pulse width WG) and the correction value A[i] as the pulse width W[i]. The initial value I0 is preliminarily set to the current generating circuit 261 of each unit circuit U. Accordingly, as shown in FIG. 14, the current value of the driving signal Xi keeps the initial value I0 within the pulse width W[i] corrected from the pulse width WG corresponding to the gray scale value G among the unit term Tu and becomes zero except the term.

The correction values A[1] to A[n] are determined by the similar procedure as in the first embodiment. The light intensity PC[i] after correction of each electro optical element E is proportional to the pulse width W[i] of the driving signal Xi. Accordingly, also in the embodiment, as shown in FIG. 5, the light intensity PC[i] after correction of an electro optical element E is reduced as the light intensity P0[i] in the case of no correction thereof increases. The lower the light intensity P0[i] in the case of no correction of the electro optical element E is, the higher the light intensity PC[i] after correction thereof is. That is, the light intensity PC[i] after correction of the electro optical element E whose light intensity P0[i] in the case of no correction exceeds the standard light intensity Pave falls below the standard light intensity Pave, and the light intensity PC[i] of the electro optical element E whose light intensity P0[i] in the case of no correction falls below the standard light intensity Pave exceeds the standard light intensity Pave. Accordingly, the variation of the light intensity of each electro optical element E can be restricted for a long period also in the embodiment similarly to the first embodiment.

Incidentally, life time of the electro optical element E (time length during which the light intensity of the electro optical element E is reduced to a predetermined percentage (for example, 80%) to the initial value) is different between the case where the light intensity PC[i] is corrected by adjusting the current value I[i] of the driving signal Xi as in the first embodiment and the case where the light intensity PC[i] is corrected by adjusting the pulse width W[i] of the driving signal Xi in the embodiment.

First, when the light intensity PC[i] of the electro optical element E is corrected by increasing the current value of the driving signal Xi from I0 to I[i] as shown in FIG. 2, the life time LT1 of the electro optical element E after correction is expressed by the formula (4) described below.

$$LT1 = LT0 \times (I0/I[i])^m \quad (4)$$

In this regard, "LT0" in the formula (4) is a life time of the electro optical element E when the current value of the driving signal Xi is kept at I0 (that is, life time in the case of no correction). Moreover, "m" in the formula (4) is a real number, for example "2" or "3", determined in accordance with the material or structure of the electro optical element E. As in the formula (4), the life time LT1 is inversely proportional to m-th power of the current value I[i] after correction. In other words, the property (light intensity) of the electro optical element E is reduced with time at a velocity proportional to m-th power of the current value I[i].

On the other hand, when the light intensity of the electro optical element E is corrected by increasing the pulse width of the driving signal Xi from WG to W[i] as in FIG. 14, the life time LT1 of the electro optical element E after correction is expressed by the formula (5) described below.

$$LT1 = LT0 \times (WG/W[i]) \quad (5)$$

That is, the life time LT1 is inversely proportional to the pulse width W[i]. In other words, the property (light intensity) of the electro optical element E is reduced at a velocity proportional to the pulse width W[i]. As described above, in the embodiment in which the pulse width W[i] of the driving signal Xi is corrected, as compared with the first embodiment in which the current value I[i] is corrected, there is an advantage in that the temporal deterioration of the electro optical element E is restricted (that is, long life time of the electro optical element E is realized).

Note that, in the structure in which the pulse width W[i] of the driving signal Xi is set in accordance with the gray scale value G and correction value A[i] as in the embodiment, it is required to sequentially output the correction value A[i] from the memory unit 33 to the pulse width setting unit 37 at the timing synchronizing with the supply of the gray scale value G, so that high operating frequency is required for the controller 30. On the other hand, in the first embodiment, it is enough to set the current value I[i] corresponding to the correction value A[i] to each unit circuit U right after application of the power of the electro optical device D, and it is not necessary to transmit the correction value A[i] afterward. Accordingly, in the first embodiment, there is an advantage in that the operating frequency required for the controller 30 is reduced.

C: Modifications

Various modifications can be made to each embodiment described above. Specific aspects of the modifications will be exemplified below. It should be noted here that each aspect described below may be appropriately combined.

(1) Modification 1

Figure 15:
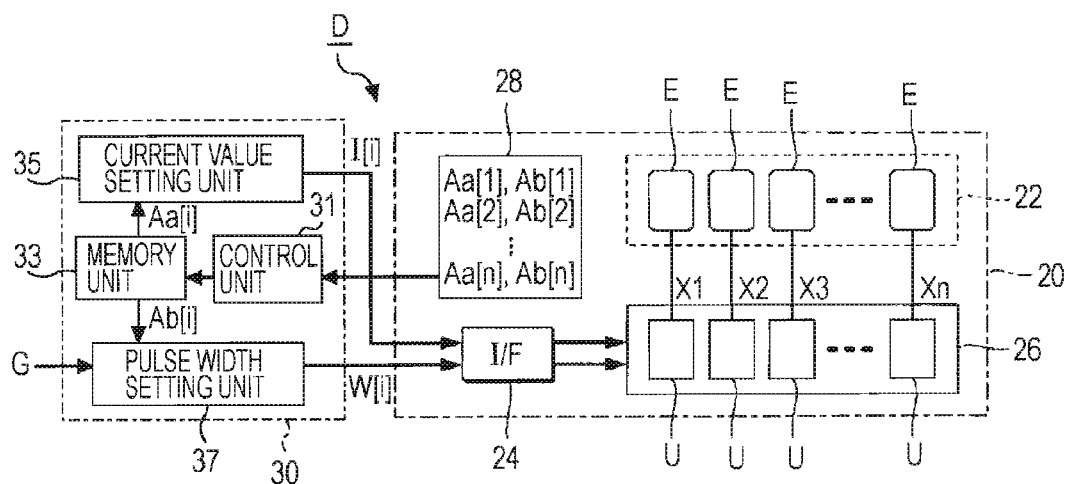
FIG. 15 is a block diagram showing a structure of an electro optical device according to a modification.

As shown in FIG. 15, the structure in which both the current value I[i] and pulse width W[i] of the driving signal Xi are corrected (that is, structure in which the first embodiment and the second embodiment are combined) may also employed. The set of correction values Aa[i] and Ab[i] are stored in the memory unit 28 in the structure of FIG. 15 for each electro optical device D. The controller 30 includes a current value setting unit 35 for setting the current value I[i] (for example, I[i]=I0×Aa[i]) based on the correction value Aa[i] and a pulse width setting unit 37 for setting the pulse width W[i] (for example, W[i]=WG×Ab[i]) based on the correction value Ab[i]. The unit circuit U generates a driving signal Xi which becomes the current value I[i] over the pulse width W[i]. The correction values Aa[i] and Ab[i] are selected so that the light intensity PC[i] of the electro optical element E when the driving signal Xi is supplied satisfies the relation of FIG. 5. The same operation and effect similarly to the first embodiment and the second embodiment can be achieved also in the structure in FIG. 15.

(2) Modification 2

Figure 16:
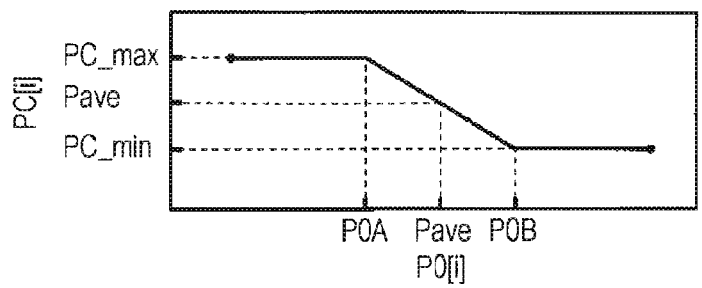
FIG. 16 is a graph showing a relation of light intensity of the electro optical element before and after correction.
Figure 17:
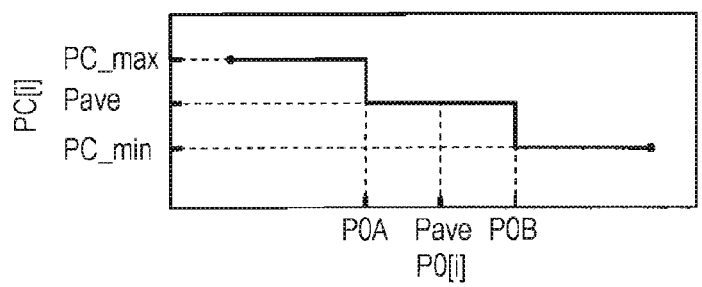
FIG. 17 is a graph showing a relation of light intensity of the electro optical element before and after correction.

The relation between the light intensity P0[i] in the case of no correction and the light intensity PC[i] after correction is not limited to the example shown in FIG. 5. For example, the correction values A[1] to A[n] may be determined so that the light intensities P0[i] and PC[i] satisfy the relation of FIGS. 16 and 17. In the structure in FIG. 16, the correction values A[1] to A [n] are determined so that the light intensity PC [i] after correction becomes a fixed value PC_max for the electro optical element E whose light intensity P0[i] in the case of no correction falls below a predetermined value P0A and the light intensity PC [i] after correction becomes a fixed value PC_min for electro optical element E whose light intensity P0[i] in the case of no correction exceeds a predetermined value P0B (>P0A). Further, in the structure of FIG. 17, in addition to the condition in FIG. 16, the correction values A[1] to A [n] are determined so that the light intensity PC[i] after correction becomes the standard light intensity Pave as for the electro optical element E whose light intensity P0[i] in the case of no correction is not less than the predetermined value P0A and not more than the predetermined value P0B.

Figure 18:
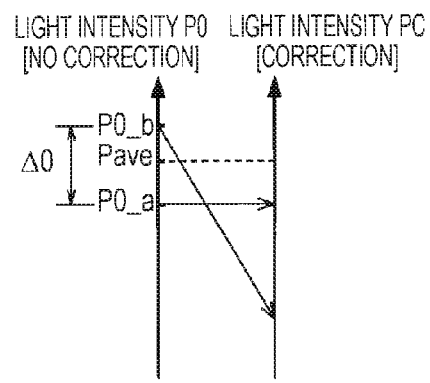
FIG. 18 is a pattern diagram showing a relation of light intensity of the electro optical device before and after correction.

Further, in each embodiment described above, the light intensity P0[i] which exceeds the standard light intensity Pave is corrected to the light intensity P0[i] which falls below the standard light intensity Pave and the light intensity P0[i] which falls below the standard light intensity Pave is corrected to the light intensity P0[i] which exceeds the standard light intensity Pave is exemplified. However, it is not necessary that the light intensity PC[i] after correction is distributed up and down the standard light intensity Pave. For example, as shown in FIG. 18, the correction values A[i] to A[n] may be determined so that the light intensity is not changed before and after correction for the electro optical element E whose light intensity P0[i] in the case of no correction becomes the minimum value P0_a (PC[i]=P0_a) and the light intensity PC[i] after correction of the other electro optical element E falls below the minimum value P0_a.

(3) Modification 3

In the each embodiment described above, the structure in which the pulse width WG of the driving signal Xi is controlled (control of gray scale by pulse width modulation) is exemplified. However, instead of the structure or in addition to the structure, the structure in which the current value of the driving signal Xi is controlled in accordance with the gray scale value G may also be employed. Further, calculation for reflecting the correction value A[i] to the light intensity PC[i] is not limited to multiplication. For example, the current value I[i] may be calculated by addition of the correction value A[i] and initial value I0 in the first embodiment and the pulse width W[i] may be calculated by addition of the correction value A[i] and pulse width WG in the second embodiment. The calculation performed in steps S23 and S24 in FIG. 9 are determined in accordance with the calculation content of the correction value A[i] at the actual correction time.

(4) Modification 4

The structure in which the memory unit 28 for storing the correction values A[1] to A[n] is mounted in the head module 20 is exemplified in each embodiment described above. However, the structure in which the memory unit 28 is mounted in the controller 30 may also be employed. Note that the correction values A[1] to A[n] are numerical numbers according to the property of each electro optical element E, so that it is necessary to manage the correspondence between the head module 20 and the memory unit 28 for each electro optical device D when the electro optical devices D in which the memory unit 28 is mounted in the controller 30 are mass-produced. In the structure of FIG. 1, the memory unit 28 is disposed in the head module 20 together with the light emitting unit 22, so that the common controllers 30 can be employed for all of the electro optical devices D even when the property of each electro optical element E is different for each electro optical device D. That is, according to the structure of FIG. 1, the management of the correspondence between the head module 20 and the controller 30 becomes unnecessary. Accordingly, there is an advantage in that the manufacturing process of the electro optical device D is simplified.

(5) Modification 5

The organic light emitting diode element is only an example of the electro optical element E. The distinction between a self emission type which emits light by itself and a non emission type which varies transmittance of outside light (for example, liquid crystal element), and the distinction between a current driven type driven by supply of current and a voltage driven type driven by application of voltage are not required as for the electro optical element applied in the invention. Various electro optical elements can be utilized in the invention. For example, there are included an inorganic EL element, a Field Emission (FE) element, a Surface-conduction Electron-emitter (SE) element, a Ballistic electron Surface emitting (BS) element, a LED (light Emitting Diode) element, a liquid crystal element, an electrophoresis element, an electro chromic element, and the like.

D: Applications

Next, a structure of an image forming device utilizing the electro optical device D according to each embodiment described above will be described.

Figure 19:
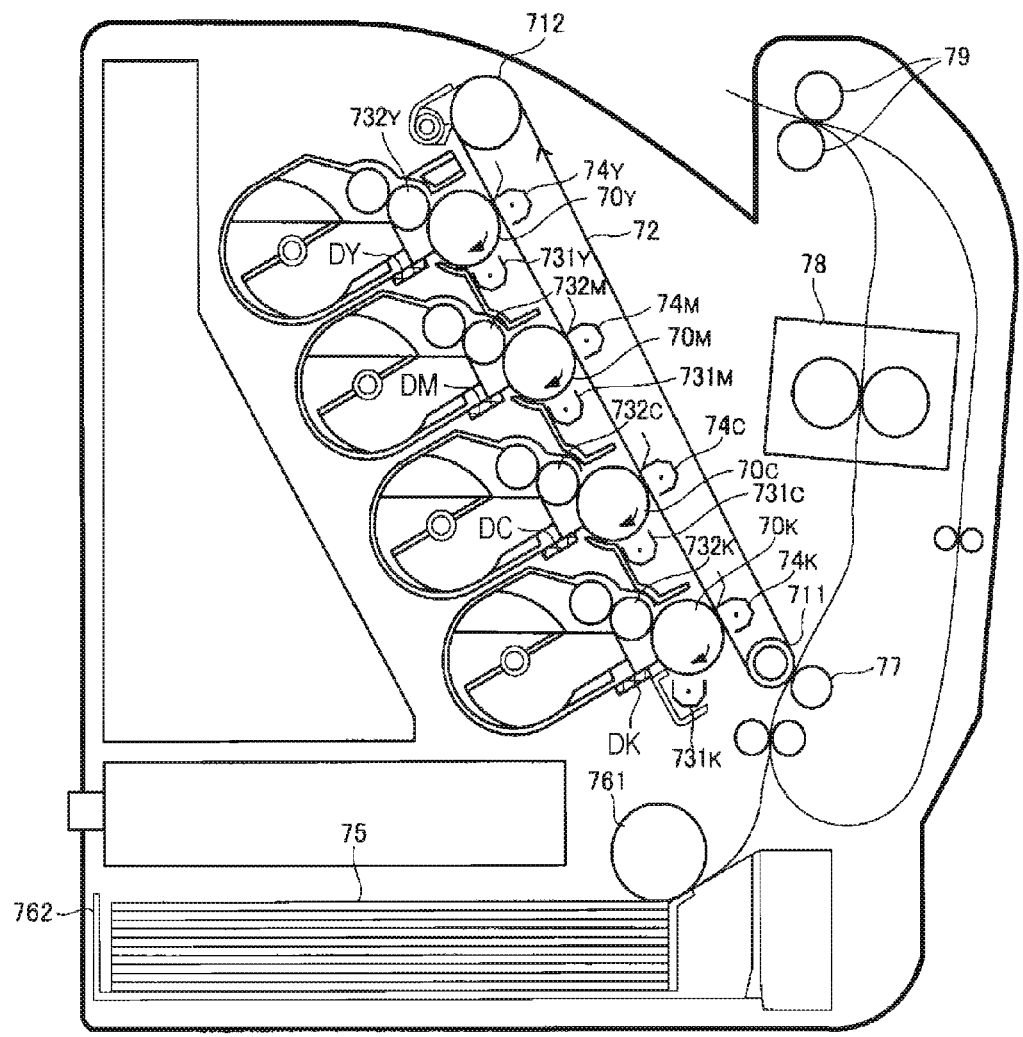
FIG. 19 is a cross sectional view showing a specific embodiment of an image forming device.

FIG. 19 is a cross-sectional view showing a structure of the image forming device in which the electro optical device D according to each embodiment described above is employed. The image forming device is a full color image forming device of a tandem type and is equipped with four electro optical devices D (DK, DC, DM, DY) according to the above embodiment and four photoreceptor drum 70 (70K, 70C, 70M, 70Y) corresponding to each electro optical device D. One electro optical device D is disposed so as to be opposed to the image forming surface (outer circumference surface) of corresponding photoreceptor drum 70. Note that the additional characters "K", "C", "M", and "Y" mean to be used for formation of each developed image of black (K), cyan (C), magenta (M), and yellow (Y)

As shown in FIG. 19, an intermediate transfer belt 72 having no ends is wound around a driving roller 711 and a driven roller 712. The four photoreceptor drums 70 are disposed around the intermediate transfer belt with a predetermined space for each other. Each photoreceptor drum 70 is rotated in synchronization with the driving of the intermediate transfer belt 72.

A corona charging device 731 (731K, 731C, 731M, and 731Y) and a developing device (732K, 732 C, 732M, and 732Y) are disposed around each photoreceptor drum 70 besides the electro optical device D. The corona charging device 731 evenly charges the image forming surface of the corresponding photoreceptor drum 70. An electrostatic latent image is formed by exposing the charged image forming surface by each electro optical device D. Each developing device 732 forms a developed image (visible image) on the photoreceptor drum 70 by transferring a developing powder (toner) on the electrostatic latent image.

A full color developed image is formed by sequentially transcribing (primary transcription) the developed images of each color (black, cyan, magenta, yellow) formed on the photoreceptor drums 70 as described above to the surface of the intermediate transfer belt 72. Four primary transfer corotron (transcription device) 74 (74K, 74C, 74M, 74Y) are disposed on the side of the intermediate transfer belt 72. Each primary transfer corotron 74 transcribes the developed image on the intermediate transfer belt 72 which passes through the space between the photoreceptor drums 70 and the primary transfer corotron 74 by electrostatically aspirating the developed image from the corresponding photoreceptor drums 70.

A sheet (recording material) 75 I is supplied from a paper feeding cassette 762 by a pickup roller 761 for every one sheet and fed to a nip between the intermediate transfer belt 72 and a secondary transfer roller 77. The full color developed image formed on the surface of the intermediate transfer belt 72 is transcribed (secondary transcription) on one surface of the sheet 75 by the secondary transfer roller 77 and fixed on the sheet 75 by passing through pair fuser rollers 78. Pair paper ejection rollers 79 eject the sheet 75 on which the developed image is fixed through the process described above.

An organic light emitting diode element is used as a light source (exposure means) in the image forming device exemplified above, so that the size of the device is downsized as compared with the structure in which a laser scanning optical system is used. Note that the electro optical device D can also be applied to the image forming device having a structure except the above exemplified one. For example, the electro optical device D can be also available in an image forming device of a rotary developing type, an image forming device of a type in which a developed image is directly transcribed to a sheet from a photoreceptor drum without using an intermediate transfer belt, or an image forming device for forming a monochrome image.

Note that the application of the electro optical device D is not limited to the exposure of an image carrying body. For example, the electro optical device D may be employed in an image reader as an illumination device for emitting light to an object to be read such as a manuscript. As an example of the image reader, there are included a scanner, a reading unit of a copier or a facsimile, a bar code reader, and a two dimensional image code reader that reads two-dimensional bar code such as QR code (registered trademark).

Further, the electro optical device in which the electro optical elements E are arranged in a matrix manner is also utilized as a display device of various electronic apparatuses. As for the electronic apparatus to which the invention is applied, there are included, for example, a mobile personal computer, a mobile cellular phone, a Personal Digital Assistants (PDA), a digital still camera, a television, a video camera, a car navigation device, a pager, an electronic organizer, an electronic paper, an electric calculator, a word processor, a work station, a television telephone, a POS terminal, a printer, a scanner, a copier, a video player, an apparatus provided with a touch panel, and the like.

The entire disclosure of Japanese Patent Application No. 2006-174945, filed Jun. 26, 2006 is expressly incorporated by reference herein.

What is claimed is:

1. A correction value determining method for each of a plurality of electro optical elements whose light intensity is controlled in accordance with a gray scale value and a correction value, the method comprising the steps of:
    (a) measuring a light intensity of each of the plurality of electro optical elements when the same gray scale value is specified to each of the plurality of electro optical elements, the plurality of electro optical elements measured including at least a first electro optical element having a first light intensity and at least a second electro optical element having a second light intensity that exceeds the first light intensity; and
    (b) determining the correction value for each of the plurality of electro optical elements such that each of the plurality of electro optical elements has a corrected light intensity, so that after the determining, a corrected light intensity of at least the first electro optical element exceeds a corrected light intensity of at least the second electro optical element.

2. The correction value determining method according to claim 1,
    in step (b), the correction value being determined for each of the plurality of electro optical elements so that a range of corrected light intensities is produced after correction of each of the plurality of electro optical elements when the predetermined gray scale value is specified thereto is distributed, the range of corrected light intensities being more narrow than a range of light intensities of each of the plurality of electro optical elements measured when the predetermined gray scale value is specified thereto in step (a) is distributed.

3. The correction value determining method according to claim 1, further comprising:

setting a standard light intensity from the light intensity of each of the plurality of electro optical elements measured in step (a), at least one of the plurality of electro optical elements having a light intensity that exceeds the standard light intensity, at least another one of the plurality of electro optical elements having a light intensity that falls below the standard light intensity, and in step (b), the correction value being determined for each of the plurality of electro optical elements so that the corrected light intensity of at least the one of the plurality of electro optical elements falls below the standard light intensity and the corrected light intensity of at least the another one of the plurality of electro optical elements exceeds the standard light intensity.

4. The correction value determining method according to claim 1, in step (b), the correction value being determined for each of the plurality of electro optical elements so that when the light intensity of more than one of the plurality of electro optical elements measured in step (a) is within a predetermined range, the corrected light intensities of the corresponding electro optical elements become the same value.

5. An electro optical device comprising:

a plurality of electro optical elements;

a driver for controlling each of the plurality of electro optical elements to have a light intensity corresponding to a gray scale value and a correction value, the plurality of electro optical elements including at least a first electro optical element having a first light intensity and at least a second electro optical element having a second light intensity that exceeds the first light intensity; and a memory for storing the correction value for each of the plurality of electro optical elements; and each correction value stored in the memory being selected so that each of the plurality of electro optical elements has a corrected light intensity, so that after the selection, a corrected light intensity of at least the first electro optical element exceeds a corrected light intensity of at least the second electro optical element.

6. The electro optical device according to claim 5, the driver controlling the electro optical element by supply of a driving current in which a current value or a pulse width is set in accordance with the correction value.

7. The electro optical device according to claim 5, the driver controlling the electro optical element by supply of a driving circuit in which a current value and a pulse width are set in accordance with the correction value.

8. An electronic apparatus comprising the electro optical device according to claim 5.

* * * * *